Apr. 3, 1923.
C. F. RIBAK
CUSHION TIRE
Filed Aug. 14, 1922
1,450,818
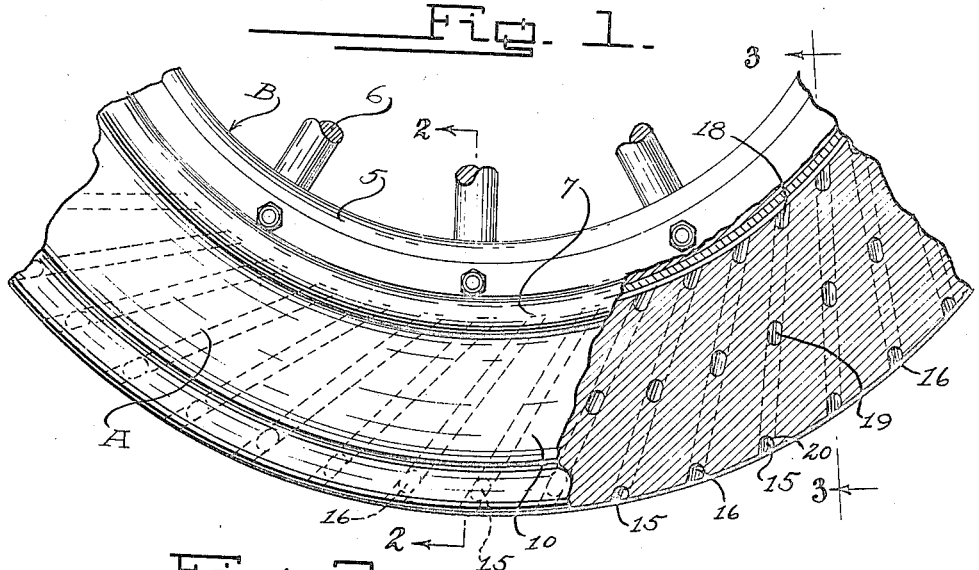
Fig. 1.
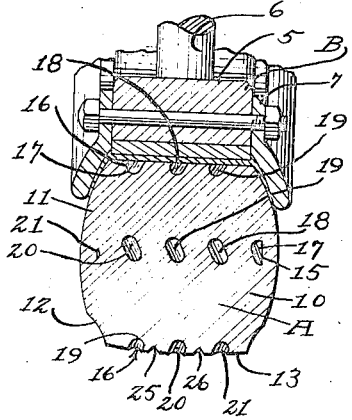
Fig. 2.
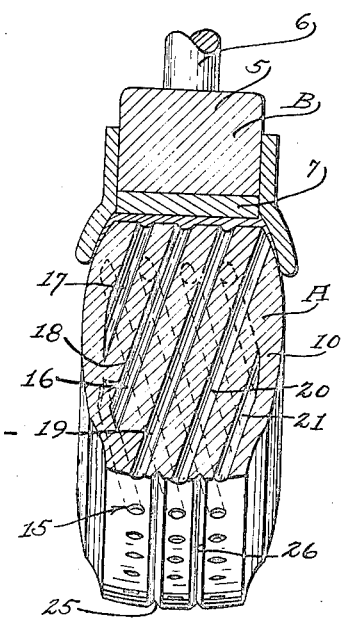
Fig. 3.
Fig. 4.
Inventor
Charles F. Ribak
By Lamaster and Morris
Attorneys Patented Apr. 3, 1923.

1,450,818

UNITED STATES PATENT OFFICE.

CHARLES F. RIBAK, OF SAN FRANCISCO, CALIFORNIA.

CUSHION TIRE.

Application filed August 14, 1922. Serial No. 581,800.

*To all whom it may concern:*

Be it known that I, CHARLES F. RIBAK, a citizen of the United States, residing at San Francisco, in the county of San Francisco and State of California, have invented certain new and useful Improvements in Cushion Tires, of which the following is a specification.

This invention relates to tires for motor vehicles and the primary object of the invention is to provide an improved tire of the solid or nonpneumatic type, which is so formed that the same will effectively absorb shock incident to the travel of the vehicle over a road way, the improved tire embodying the advantages of the pneumatic tire without the disadvantages associated therewith, such as blow outs, punctures and the like.

A further object of the invention is to provide an improved automobile truck tire including an annular solid body having a plurality of openings formed therein and arranged in such a manner that the tire will effectively absorb shock coming on the tire laterally and on the tread of the tire.

A further object of the invention is to provide a vehicle truck tire constructed of solid rubber and having a plurality of rows of inwardly inclined openings, disposed at an obtuse angle to the road way, said transversely extending rows of openings being disposed in such a manner that every other row inclines toward one lateral face of the tire while every other row inclines toward the opposite lateral face of the tire.

A still further object of the invention is to provide an improved cushion tire of the above character, which will not only absorb shock coming from the tread of the tire and from the side walls of the tire but which will effectively prevent skidding of the tire and permit a firm grip to be obtained by the tire on the road way.

A still further object of the invention is to provide an improved cushion tire of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings—

Figure 1 is a fragmentary side elevation of the improved tire showing the same applied to a fragment of a vehicle wheel, part of the tire being shown in longitudinal section.

Fig. 2 is a radial section through the improved tire and the vehicle wheel rim taken on the line 2—2 of Figure 1.

Fig. 3 is a transverse section taken at an angle to the radius of the wheel through the improved tire and the wheel felly on the line 3—3 of Figure 1, and Fig. 4 is a fragmentary plan view of the improved cushion tire.

Referring to the drawings in detail, wherein similar reference characters designate corresponding parts throughout the several views, the letter A generally indicates the improved cushion tire and B a vehicle wheel with which the same can be associated.

The vehicle wheel B may be of any preferred character and has been merely shown to illustrate the use of the improved tire and as shown the wheel includes the felloe 5 and the spokes 6. The felloe 5 can carry any suitable type of rim 7 for holding the tire A on the wheel and as the rim forms no part of the present invention the same will not be described in detail.

The improved tire A includes the annular body 10 formed of tough rubber so treated as to produce a tough and resilient body. The tire may be of any preferred or accepted transverse configuration and as clearly shown in Figures 2 and 3 of the drawing, the side walls 11 are bulged outwardly and the periphery of the tire adjacent to the side edges thereof is grooved as at 12 to provide the reduced tread 13, which permits lateral expansion of the tread and insures against the tread of the tire extending beyond the side walls thereof.

The tire body 10 throughout its entire circumference is provided with a plurality of transversely extending rows 15 and 16, of openings 17, 18, 19, 20 and 21. All of these rows 15 and 16 of the openings 17, 18, 19, 20 and 21 are disposed at an incline to the radius of the wheel and thus when a true radial section is taken through the tire a plurality of rows of openings will be disposed in overlapped relation which of course will increase the resiliency and cushioning effect of the tire. These rows of openings 15 and 16 are preferably inclined forwardly as clearly shown in Figure 1 of the drawings. The rows 15 of openings 17, 18, 19, 20 and 21 extend intermediate the rows 16 of openings 17, 18, 19, 20 and 21 and the rows extend diagonally across the tire from the tread thereof toward one side wall while the rows 16 of the openings 17, 18, 19, 20 and 21 extend diagonally across the tire in the opposite direction from the tread toward the other side wall.

All of the openings 17, 18, 19, 20 and 21 are in the nature of air cells and form means for successively absorbing shock.

The openings 19 and 20 extend entirely through the tire body 10 and open on the tread and inner periphery thereof. The openings 17 and 18 terminate short of the side wall of the tire and extend through the inner periphery thereof. The openings or cells extend inwardly from the tread and terminate short of the opposite side wall of the tire.

Owing to the arrangement of these rows 15 and 16 of the openings, the tire will effectively absorb shock coming on the tread of the tire and on the side walls of the tire.

The arrangement of the rows 15 and 16 of the openings is such that the same will increase the tractive qualities of the tire and effectively prevent lateral skidding thereof. If desired, the tread of the tire can be provided with annular grooves 25 and 26 and these grooves are disposed between the openings 19, 20 and 21. It also can be seen by referring to Figure 3 of the drawings that the openings constituting the rows of openings 15 and 16 are arranged in circumferential alignment.

From the foregoing description it can be seen that an improved cushion tire has been provided which will effectively absorb shock and which will increase the tractive qualities of the tire and prevent skidding thereof.

Changes in details may be made without departing from the spirit or scope of this invention; but,

I claim:

1. A cushion tire for vehicles comprising an annular body having rows of openings therethrough alternately extending in opposite diagonal relation across the tire, and the periphery of the tire having circumferentially extending grooves disposed between the rows of openings.

2. A cushion tire for motor vehicles comprising an annular body having a plurality of spaced transversely extending rows of openings, the alternate rows of openings extending in opposite diagonal relation across the tire, and the periphery of the tire having circumferentially extending grooves disposed between the rows of openings.

3. A cushion tire for motor vehicles comprising an annular solid body having a plurality of transversely extending rows of openings, the alternate rows of openings being disposed in opposite diagonal relation, all of the rows of openings extending rearwardly at an incline to the radii of the tire, the periphery of the tire having circumferentially extending grooves formed therein disposed between the openings of the rows of openings.

4. A cushion tire for vehicles comprising an annular body having a plurality of rows of transversely disposed air cells, the alternate rows of air cells extending diagonally across the tire in opposite relation, all of the air cells inclining rearwardly at an angle to the radii of the body, certain of the cells extending inwardly from the tread of the body to the inner periphery of the body, certain other of the cells extending from the tread and terminating short of one of the side walls of the body, other cells starting inwardly of the opposite side wall of the body and extending through the inner periphery of the body.

CHARLES F. RIBAK.